(12) United States Patent
Colavincenzo (10) Patent No.: US 10,017,039 B1
(45) Date of Patent: Jul. 10, 2018

(54) VEHICLE PLATOONING WITH A HYBRID ELECTRIC VEHICLE SYSTEM

(71) Applicant: Bendix Commercial Vehicle Systems LLC, Elyria, OH (US)

(72) Inventor: David Colavincenzo, Castalia, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 15/655,089

(22) Filed: Jul. 20, 2017

(51) Int. Cl.
| | |
|---|---|
| B60K 6/22 | (2007.10) |
| G08G 1/00 | (2006.01) |
| G08G 1/16 | (2006.01) |
| B60W 10/26 | (2006.01) |
| B60W 10/04 | (2006.01) |
| B60W 10/18 | (2012.01) |
| G01S 13/93 | (2006.01) |

(52) U.S. Cl.
CPC ............. *B60K 6/22* (2013.01); *B60W 10/04* (2013.01); *B60W 10/18* (2013.01); *B60W 10/26* (2013.01); *G08G 1/163* (2013.01); *G08G 1/22* (2013.01); *G01S 2013/9325* (2013.01)

(58) Field of Classification Search
CPC .............................................. G01S 2013/9325
See application file for complete search history.

(56) References Cited

U.S. PATENT DOCUMENTS

| | | | |
|---|---|---|---|
| 7,552,705 B2 | 6/2009 | Serkh et al. | |
| 8,808,124 B2 | 8/2014 | Major et al. | |
| 9,238,995 B2 | 1/2016 | Gonze et al. | |
| 2008/0110683 A1 | 5/2008 | Serkh | |
| 2013/0041576 A1* | 2/2013 | Switkes | G08G 1/166 701/123 |
| 2013/0124064 A1* | 5/2013 | Nemoto | B60K 31/0058 701/96 |
| 2016/0144721 A1* | 5/2016 | Soo | B60L 7/26 701/22 |
| 2018/0050686 A1* | 2/2018 | Atluri | B60W 20/40 |

\* cited by examiner

*Primary Examiner* — Laura Nguyen
(74) *Attorney, Agent, or Firm* — Crowell & Moring LLP (57) ABSTRACT

A system and method are provided for controlling the operation of a vehicle equipped with a hybrid electric front end motor-generator system during vehicle platooning operations to maintain a predetermined separation distance between vehicles in the vehicle platoon. The motor-generator is operated to generate vehicle acceleration and deceleration by outputting torque to an engine crankshaft to accelerate the vehicle or generating a regenerative braking load via the crankshaft on the vehicle, in place of the vehicle's internal combustion engine and braking systems, when the required vehicle accelerations and/or decelerations needed to maintain the desired vehicle separation distance are small and within the torque output or torque load capacity of the motor-generator. If the required vehicle acceleration or deceleration is greater than the motor-generator's available capacity, the motor-generator may be operated to provide a portion of the required acceleration or deceleration, as a supplement to the acceleration provided by the engine or the deceleration provided by the braking system. The use of a front end motor-generator system in this manner increases overall vehicle energy efficiency by decreasing fuel consumption and increasing the amount of electrical energy captured for storage during vehicle platooning operations.

19 Claims, 7 Drawing Sheets

VEHICLE PLATOONING WITH A HYBRID ELECTRIC VEHICLE SYSTEM

BACKGROUND OF THE INVENTION

The present invention relates to hybrid electric vehicles, in particular to a system and method for platooning operation of a vehicle equipped for selective coupling of a hybrid electric generating and storage system with an internal combustion engine.

BACKGROUND AND SUMMARY OF THE INVENTION

Co-pending U.S. patent application Ser. No. 15/378,139, the disclosure of which is incorporated herein by reference, discloses a hybrid electric vehicle, in particular for commercial and off-road vehicles, e.g., trucks and busses in Vehicle Classes 2-8, in earth-moving equipment and railroad applications, and in stationary internal combustion engine-powered installations, in which an internal combustion engine is combined with a selectively-engageable motor-generator and an electrical energy storage system in a unique arrangement. In this system, referred to as a Front End Motor-Generator ("FEMG") system, a motor-generator is preferably located in the front region of the engine and is supported on a torque transfer segment, for example, a narrow-depth single reduction parallel shaft gearbox arranged with its input rotation axis co-axial with the engine crankshaft. The selective engagement of the motor-generator may be via a switchable (i.e., disengageable) coupling between the torque transfer segment and the front end of the crankshaft. The switchable coupling includes an engine-side portion coupled directly to the engine crankshaft, a drive portion engageable with the engine-side portion to transfer torque therebetween, and an engagement device, preferably an axially-actuated clutch between the drive portion and the engine-side portion. The drive portion is coupled to the motor-generator via the torque transfer segment, and to an engine accessory drive which drives engine accessories, such as an engine cooling fan and a compressor. This arrangement enables transfer of torque between the accessory drive, the motor-generator and the engine in a flexible manner, for example, having the accessory drive being driven by different torque sources (e.g., the engine and/or the motor-generator), having the engine the being the source of torque to drive the motor-generator as an electric generator to produce electrical energy for storage in the energy store, and/or having the motor-generator coupled to the engine and operated as a motor to act as a supplemental vehicle propulsion torque source.

In the field of commercial vehicles, development of vehicles capable of autonomous or semi-autonomous driving is advancing. One of the potential applications for this development is the so-called "platooning" of multiple vehicles such as tractor-trailers, where the vehicles follow one another at closer following distance intervals than are normally maintained by human drivers, with the lead vehicle directly or indirectly controlling the acceleration and deceleration of all of the following vehicles.

There are several potential advantages to platooning, including potential fuel savings due to decreased wind resistance at highway speeds for the following vehicles. However, there are also potential disadvantages.

For example, for the same reason that platooning reduces aerodynamic drag, platooning also reduces the airflow through the vehicle cooling systems of the following vehicles due to their close proximity to the preceding vehicle. As less ram air is available through the engine radiator and charge air cooler, in the absence of an FEMG system each following vehicle can be expected to operate its engine cooling fan more often and/or at a greater rotational speed (and associated greater parasitic energy demand on the engine) to meet the increased cooling requirement. Alternative solutions for this problem are equally unattractive. For example, insufficient cooling in platooning operations could be avoided by providing the following vehicles with larger heat exchangers (e.g., larger coolant radiator(s)) or fans in the cooling system, but larger heat exchangers are detrimental to vehicle aerodynamics and thus increase fuel consumption. Similarly, the target separation distance between the following vehicles could be increased to permit additional flow from the air stream to enter the gap between adjacent vehicles and thence flow into the following vehicle's engine compartment, but increasing the following distance would also reduce substantially impair the effectiveness of the aerodynamic gains of mutual-vehicle operation, one of the original objectives of platooning.

There is also the problem of potential loss of efficiency due to the need for each of the following vehicles to constantly be making micro-adjustments to their speed in order to maintain the vehicle's position behind the preceding vehicle within a narrow tolerance; this problem is only exacerbated by uneven ground and in dense traffic situations. The small accelerations and braking actions required for these micro-adjustments are typically made by controlling the engine throttle, applying the vehicle brakes or applying an engine or transmission retarder, all of which ultimately result in increased fuel consumption (either immediately as the engine accelerates the vehicle, or subsequently after the vehicle is slowed and needs to again accelerate to maintain the target platoon separation distance).

A further concern is that during extended platooning operations typically there are few large braking events, and hence few opportunities to generate and store large amounts of electrical energy by regenerative braking.

An FEMG system, including its control unit with relevant programming, may be used to address these and other problems in the context of vehicle platooning. For example, when the controller of the FEMG system recognizes that the vehicle is in a platoon operating mode and there is sufficient electrical energy in the energy store, the FEMG system may monitor engine coolant temperature and if above a target temperature, command the switchable coupling to disengage and use the motor-generator to drive the cooling fan at a higher rpm than would be possible if the cooling fan were being driven by the engine crankshaft. Alternatively, if an engine coolant pump is driven by the accessory drive on the drive side of eth switchable coupling, the motor-generator could increase the coolant flow rate through the coolant radiator by increasing the speed of the coolant pump. This alternative also may permit the cooling fan, which is one of the highest energy demands in an engine accessory drive, to be operated less frequently or at a lower rotation speed. Conversely, if the vehicle's cooling demands are being met in the current ambient conditions, the motor-generator may drive the cooling fan at a slower speed than the engine crankshaft would otherwise dictate, decreasing the overall energy consumption of the vehicle by removing the parasite load of a cooling fan being operated at a higher rotational speed than needed. The infinitely variable speed control of the FEMG motor-generator when decoupled from the engine crankshaft by the switchable coupling, enables fine control of such engine accessory speeds to use only as much drive energy as needed for the present driving situation, thereby further improving overall vehicle energy efficiency The FEMG may also be used as the primary source of the micro-adjustment accelerations and decelerations required to meet a target multi-vehicle platooned operation parameter, such as a predetermined separation distance, a predetermined following time and/or a predetermined vehicle speed. Such use of an FEMG system to handle micro-adjustments permits an engine to operate at a more consistent (and economical) throttle setting and permits an increase in the amount of electrical energy captured for storage that would otherwise be dissipated by the brakes as wasted heat energy.

For example, an FEMG system's motor-generator may be sized to provide on the order of 80 kilowatts of vehicle retarding energy absorption via the engine crankshaft to the vehicle, and to generate more than 200 Nm of torque to the crankshaft to accelerate the vehicle. Both of these amounts are sufficient to cover a majority of platooning micro-acceleration and deceleration demands, with only infrequent need to use the engine or the vehicle brakes when larger acceleration or deceleration demands are present. Moreover, the motor-generator's ability to virtually instantaneously shift from producing torque to absorbing energy in regenerative braking is well suited to provide a more precise control of vehicle speed and separation distance than is possible by slower-acting mechanical engine and brake components.

The use of an FEMG system motor-generator for platooning vehicle control may significantly enhance the amount of electrical energy generated and stored in the energy store over time that otherwise would be lost. Specifically, although the amount of electrical energy generated in any individual micro-deceleration (i.e., the micro application of a retarding force by operating the motor-generator in regenerative braking mode while the switchable coupling is engaged with the crankshaft) may be small, over time the repetitive accumulation of these micro-energy amounts may significantly raise the charge state of the energy store. This in turn may result in increased overall vehicle operation efficiency, for example by providing greater available electrical energy to operate the vehicle's systems upon arrival at a destination (for example, to power vehicle system and driver sleeper compartment demands during an overnight rest period).

Although the present disclosure discusses the invention primarily in the context of platooning operations with a vehicle equipped with an FEMG system, the invention's approach to platooning operations is not limited solely to vehicles equipped with FEMG systems. Rather, the present invention may be used in platooning operations with vehicles equipped with any hybrid electric system arranged to apply torque to, or receive torque from, the drivetrain, if the hybrid electric system is capable of generating or receiving torque suitable for maintaining the vehicle's position in a platoon.

Other objects, advantages and novel features of the present invention will become apparent from the following detailed description of the invention when considered in conjunction with the accompanying drawings.

DETAILED DESCRIPTION OF THE DRAWINGS

Figure 1:
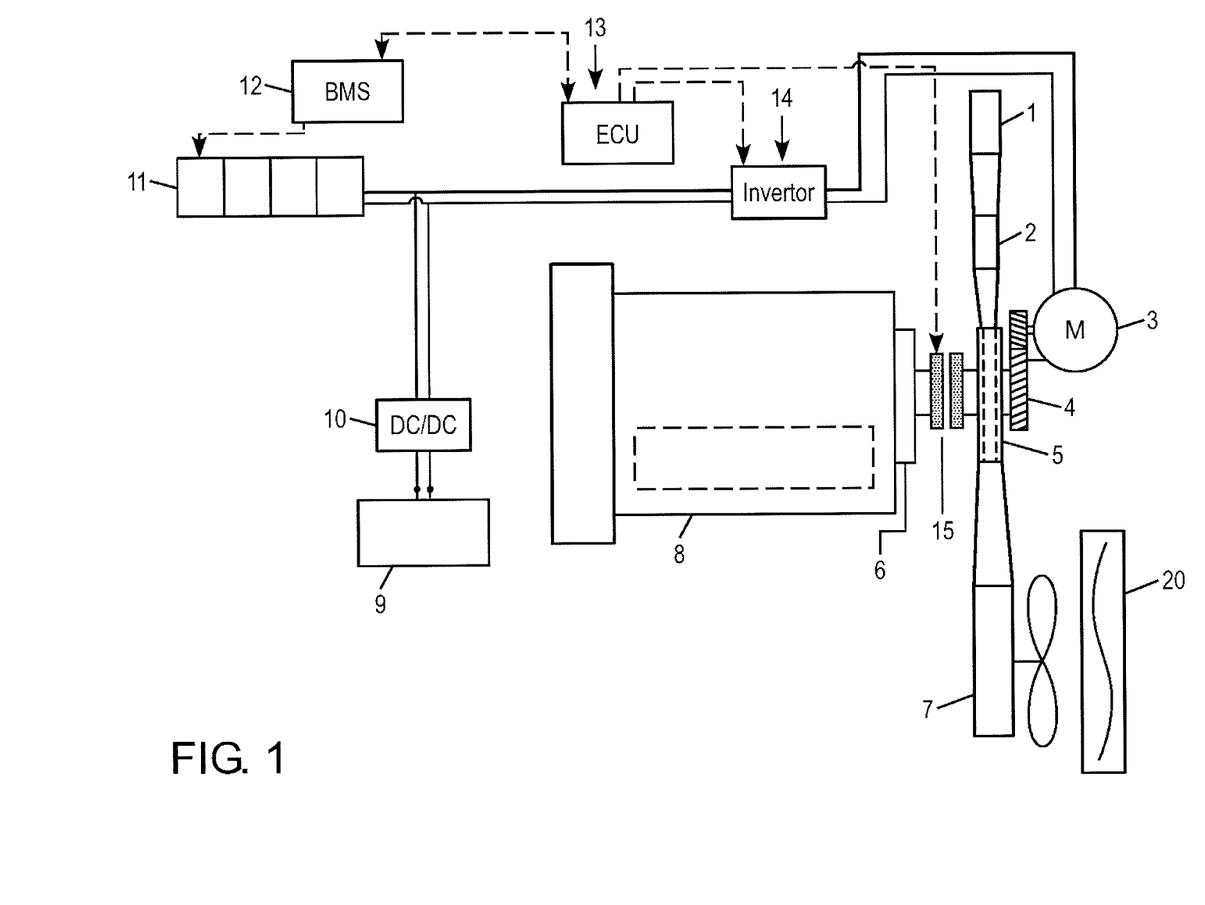
FIG. 1 is a schematic illustration of an overall view of the arrangements of an FEMG system in accordance with an embodiment of the present invention.
Figure 2:
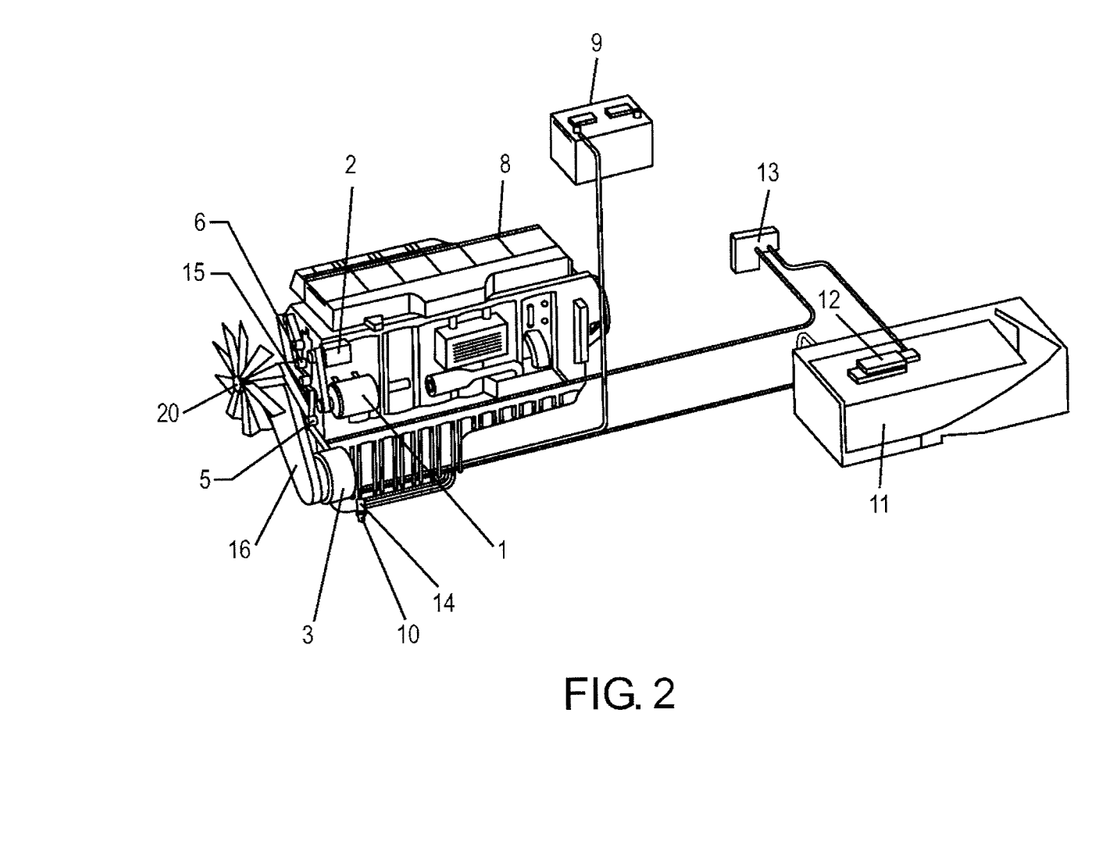
FIG. 2 is a schematic oblique view of the arrangements of an FEMG system in accordance with an embodiment of the present invention.

FIG. 1 is a schematic illustration showing components of an embodiment of an FEMG system in accordance with the present invention. FIG. 2 is a schematic illustration of several of the FEMG system components in the chassis of a commercial vehicle. In this arrangement, the engine accessories (including air compressor 1, air conditioning compressor 2 and engine cooling fan 7 arranged to pull cooling air through engine coolant radiator 20) are belt-driven from a pulley 5. The pulley 5 is located co-axially with a damper 6 coupled directly to the crankshaft of the internal combustion engine 8. The accessories may be directly driven by the drive belt or provided with their own on/off or variable-speed clutches (not illustrated) which permit partial or total disengagement of an individually clutch-equipped accessory from the belt drive.

In addition to driving the accessory drive belt, the pulley 5 is coupled a drive unit having reduction gears 4 to transfer torque between a crankshaft end of the drive unit and an opposite end which is coupled to a motor-generator 3 (the drive unit housing is not illustrated in this figure for clarity). A disengageable coupling in the form of a clutch 15 is arranged between the crankshaft damper 6 and the pulley 5 (and hence the drive unit and the motor-generator 3). Although schematically illustrated as axially-separate components for clarity in FIG. 1, in this embodiment the crankshaft 6, clutch 15 and pulley 5 axially overlap one another at least partially, thereby minimizing an axial depth of the combined pulley-clutch-damper unit in front of the engine. Actuation of the pulley-clutch-damper clutch 15 between its engaged and disengaged states is controlled by an electronic control unit (ECU) 13.

On the electrical side of the motor-generator 3, the motor-generator is electrically connected to a power invertor 14 which converts alternating current (AC) generated by the motor-generator output to direct current (DC) useable in an energy storage and distribution system. The power invertor 14 likewise in the reverse direction converts direct current from the energy storage and distribution system to alternating current input to power the motor-generator 3 as a torque-producing electric motor. The inverter 14 is electrically connected to an energy storage unit 11 (hereafter, an "energy store"), which can both receive energy for storage and output energy on an on-demand basis.

In this embodiment, the energy store 11 contains Lithium-based storage cells having a nominal charged voltage of approximately 3.7 V per cell (operating range of 2.1 V to 4.1 V), connected in series to provide a nominal energy store voltage of 400 volts (operating voltage range of approximately 300 V to 400 volts) with a storage capacity of between approximately 12 and 17 kilowatt-hours of electrical energy. Alternatively, the cells may be connected in series and parallel as needed to suit the application. For example, 28 modules with four series-connected cells per module could be connected in series and in parallel to provide an energy store with the same 17 kilowatt hours of stored energy as the first example above, but with a nominal operating voltage of 200 V volts and twice the current output of the first example.

In addition to the relatively high-capacity, low charge-discharge rate Lithium-based storage cells, the energy store 11 in this embodiment includes a number of relatively low-capacity, high charge-discharge rate of super capacitors to provide the energy store the ability over short periods to receive and/or discharge very large electrical currents that could not be handled by the Lithium-based storage cells (such cells being typically limited to charge/discharge rates of less than 1 C to only a few C).

Figure 3:
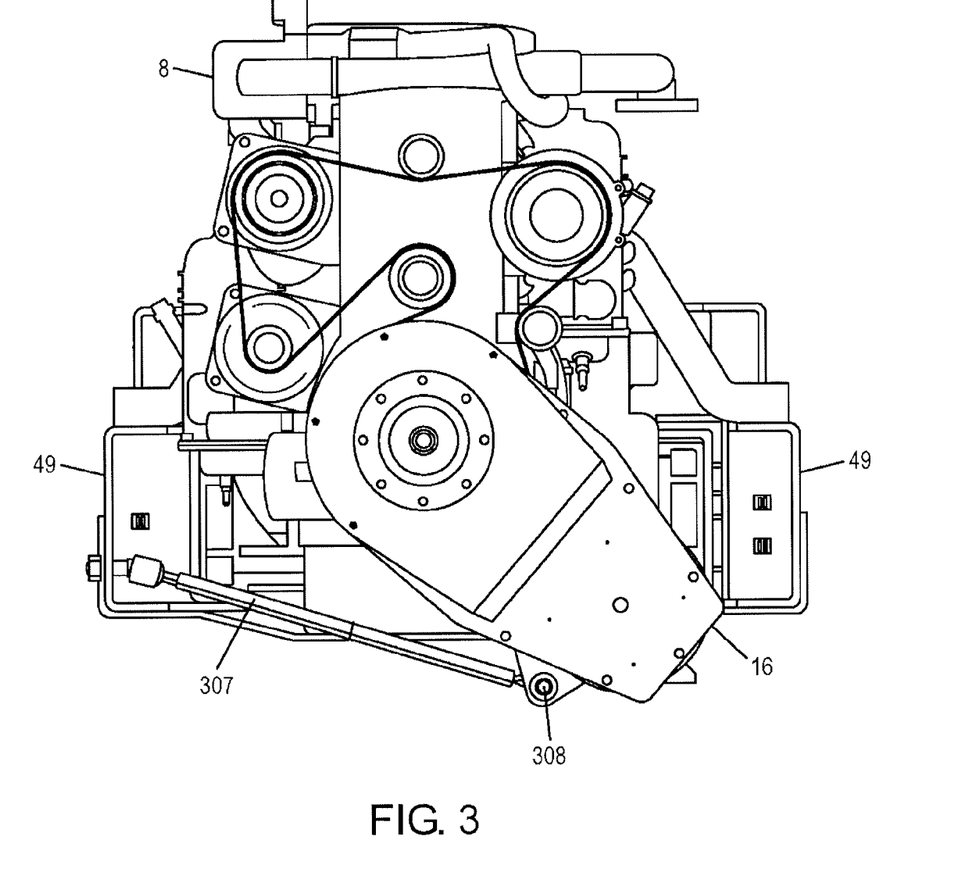
FIG. 3 is a schematic illustration of an FEMG gearbox mounting arrangement in accordance with an embodiment of the present invention.

FIG. 3 shows another view of a FEMG arrangement viewed from the front of the engine 8, with the FEMG gearbox 16 secured against rotation or transverse motion relative to the engine 8 by a torque arm 307 (aka tie-rod) is attached at one end to an anchor point 308 of the gearbox, and at the opposite end to the adjacent frame rail 49.

Figure 4:
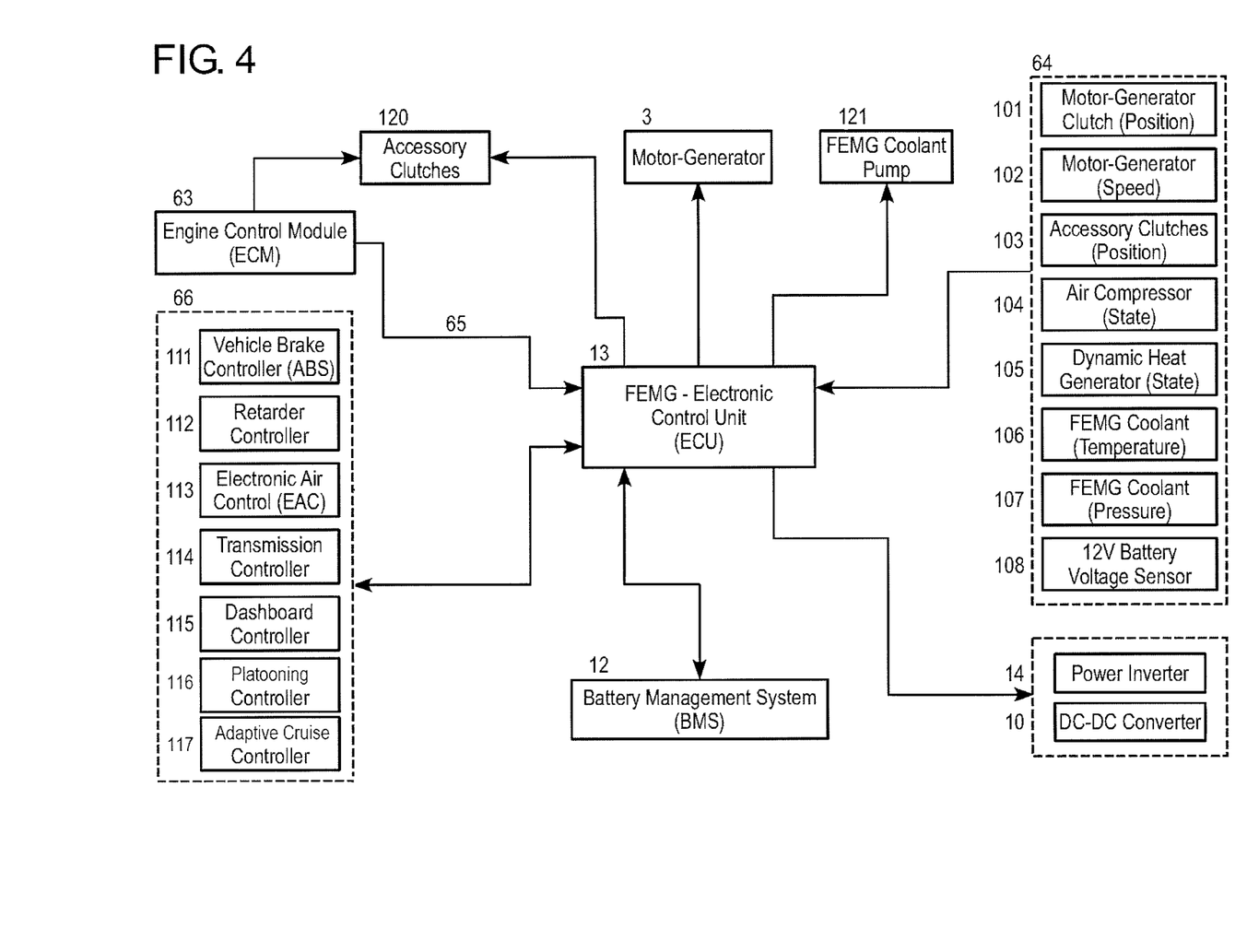
FIG. 4 is a block diagram of FEMG system control and signal exchange arrangements in accordance with an embodiment of the present invention.

The FEMG motor-generator 3, as well as the other components of the FEMG system, in this embodiment are controlled by the central FEMG control module 13, an electronic controller ("ECU"), as schematically illustrated in FIG. 4. With respect to the motor-generator, the FEMG control module: (i) controls the operating mode of the motor-generator, including a torque output mode in which the motor-generator outputs torque to be transferred to the engine accessories and/or the engine crankshaft via the clutch-pulley-damper unit, a generating mode in which the motor-generator generates electrical energy for storage, an idle mode in which the motor-generator generates neither torque or electrical energy, and a shutdown mode in which the speed of the motor-generator is set to zero (a mode made possible when there is no engine accessory operating demand and the clutch of the clutch-pulley-damper unit is disengaged); and (ii) controls the engagement stated of the clutch-pulley-damper unit (via components such as solenoid valves and/or relays as required by the type of clutch actuator being employed).

The FEMG control module 13 controls the motor-generator 3 and the clutch-pulley-damper unit 19 based on a variety of sensor inputs and predetermined operating criteria, as discussed further below, such as the state of charge of the energy store 11, the temperature level of the high voltage battery pack within the energy store, and the present or anticipated torque demand on the motor-generator 3 (for example, the torque required to achieve desired engine accessory rotation speeds to obtain desired levels of engine accessory operating efficiency). The FEMG control module 13 also monitors motor-generator- and engine crankshaft-related speed signals to minimize the potential for damaging the clutch components by ensuring the crankshaft-side and pulley-side portions of the clutch are speed-matched before signaling the clutch actuator to engage the clutch.

The FEMG control module 13 communicates using digital and/or analog signals with other vehicle electronic modules, both to obtain data used in its motor-generator and switchable coupling control algorithms, and to cooperate with other vehicle controllers to determine the optimum combination of overall system operations. In one embodiment, for example, the FEMG control module 13 is configured to receive from a brake controller a signal to operate the motor-generator in generating mode to provide regenerative braking in lieu of applying the vehicle's mechanical brakes in response to a relatively low braking demand from the driver. The FEMG control module 13 is programmed to, upon receipt of such a signal, evaluate the current vehicle operating state and provide the brake controller with a signal indicating that regenerative braking is being initiated, or alternatively that electrical energy generation is not desirable and the brake controller should command actuation of the vehicle's mechanical brakes or retarder.

In the FIG. 4 example of the integration of electronic controls in an FEMG system, the FEMG control module 13 receives and outputs signals, communicating bi-directionally over the vehicle's CAN bus with sensors, actuators and other vehicle controllers. For example. the FEMG control module 13 communicates with the battery management system 12 which monitors the state of charge of the energy store 11 and other related energy management parameters, with an engine control unit 63 which monitors engine sensors and controls operation of the internal combustion engine, and with the FEMG system's electrical energy management components, including the power inverter 14 which handles AC/DC conversion between the AC motor-generator 3 and the DC portion of the electrical bus between the vehicle's DC energy storage and electrical consumers (not illustrated in this figure). The FEMG control module 13 further communicates with the vehicle's DC-DC converter 10 which manages the distribution of electrical energy at voltages suitable for the consuming device, for example, conversion of 400 V power from the energy store 11 to 12 V required by the vehicle's 12 V battery 9 and the vehicle's various 12 V equipment, such as lighting, radio, power seats, etc. The FEMG control module 13 also communicates with various vehicle controllers 66, including brake controller 11, retarder controller 112, electronic air controller 113, transmission controller 114, dashboard controller 115, platooning controller 116 and adaptive cruise control with braking controller 117. The latter two controllers would, among other operations, request acceleration or deceleration as appropriate during vehicle operation in platoon mode.

FIG. 4 also illustrates the communication of data as inputs into the FEMG system control algorithms from sensors 64 associated with the motor-generator 3, the switchable coupling (in this embodiment, a clutch position sensor associated with a clutch-pulley-damper unit 19), various engine accessories 1 (for example, a motor-generator clutch position sensor 101, a motor-generator speed sensor 102, engine accessory clutch positions 103, air compressor state sensors 104, dynamic heat generator state sensors 105, an FEMG coolant temperature sensor 106, an FEMG coolant pressure sensor 107, and a 12 V battery voltage sensor 108).

Outputs from the FEMG control module 13 include commands to control the generation of electrical energy or torque output from the motor-generator 3, commands for engaging and disengaging of the clutch of the clutch-pulley-damper unit 19, and commands for controlling the operation of various engine accessories.

Figure 5:
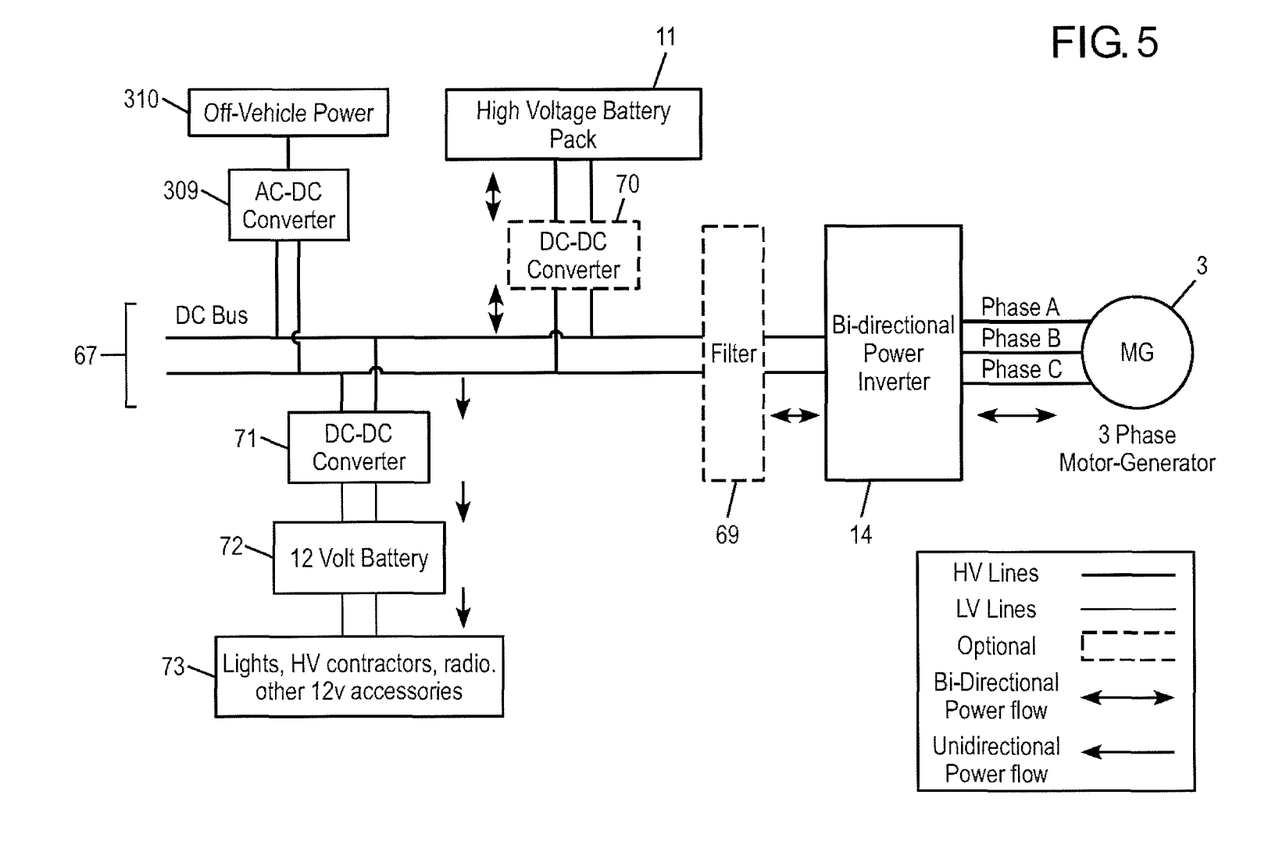
FIG. 5 is a schematic illustration of AC and DC portions of the electrical network of an FEMG system in accordance with an embodiment of the present invention.

The relationship between the power electronics and current distribution in the present embodiment is shown in greater detail in FIG. 5. The three phases of the alternating current motor-generator 3 are connected to the AD/DC power inverter 14 via high voltage connections. Electrical energy generated by the motor-generator 3 is converted to high voltage DC current to be distributed on a DC bus network 67. Conversely, DC current may be supplied to the bi-directional power invertor 14 for conversion to AC current to drive the motor-generator 3 as a torque-generating electric motor. FIG. 5 also shows two primary DC bus connections, the high voltage lines between the power inverter 14 and the energy store 11. The bi-directional arrows in this figure indicate that DC current may pass from the power inverter 14 to the energy store 11 to increase its state of charge, or may flow from the energy store to the DC bus 67 for distribution to the power invertor 14 to drive the motor-generator 3 or to other DC voltage consumers connected to the DC bus. In this embodiment, a DC/DC voltage converter 70 is provided between the DC bus and the energy store 11 to adapt the DC voltage on the DC bus generated by the motor-generator 3 to the preferred operating voltage of the energy store. FIG. 5 further shows that the DC bus 67 also may be connected to an appropriate voltage converter, such as AC-DC voltage converter 309 that converts electric energy from an off-vehicle power source 310, such as a stationary charging station, to the voltage on DC bus 67 to permit charging of the energy store independent from the motor-generator 3 when the vehicle is parked.

In addition to the bi-directional flow of DC current to and from the energy store 11, the DC bus 67 supplies high voltage DC current to the DC to DC converter, which then provides low voltage power to vehicle electrical consumers, such as vehicle lights, radios and other typically 12 V-powered devices, as well as to 120 V AC current devices such as a driver sleeper compartment air conditioner and/or a refrigerator or cooking surface. In both cases an appropriate voltage converter is provided to convert the high voltage on the DC bus 67 to the appropriate DC or AC current at the appropriate voltage. In the embodiment shown in FIG. 5, a DC/DC converter 71 converts DC current at a nominal voltage on the order of 400 V to 12 V DC current to charge one or more conventional 12 V batteries 72. The vehicle's usual 12 V loads 73 thus are provided with the required amount of 12 V power as needed, without the need to equip the engine with a separate engine-driven 12 V alternator, further saving weight and cost while increasing overall vehicle efficiency.

In this embodiment, the FEMG system operates in several modes, including generator mode, motor mode, idle mode, off mode, stop/start mode and platooning mode. The mode selected for the current operating conditions is based at least in part on the current state of charge of the energy store 11, which the FEMG control module 13 is programmed to recognize based on data received from the battery management system 12.

Figure 6:
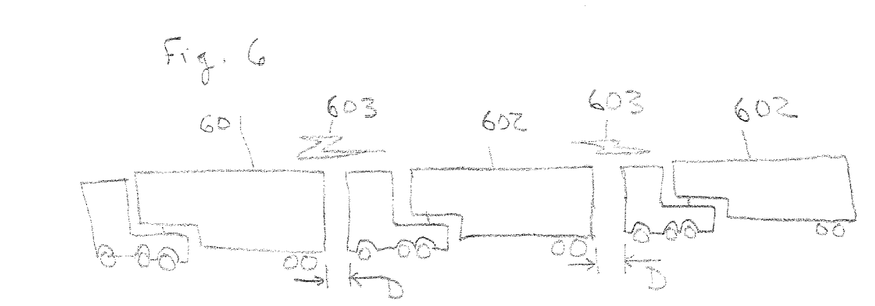
FIG. 6 is a schematic illustration of a vehicle platoon.

As shown, for example, in FIG. 6, in platooning mode multiple vehicles (in this embodiment lead commercial vehicle 601 and following commercial vehicles 602) travel along a roadway together. The vehicles are separated by a target separation distance D, which may be predetermined as either a fixed value or as variable distance based on current environment and vehicle operating conditions. The vehicles communicate and share with one another via wireless communications 603, which may be any of several communications technologies, for example using transmitters and receivers for wireless (for example, using Bluetooth, WiFi, RKE, Zigbee and/or IEEE 802.11 protocols), optical (for example, laser and/or infrared) and/or acoustic data transfer. The following vehicles 602 manage the separation distance to their respective preceding vehicle based on communications from the lead vehicle 601 and optionally based on additional communications from one or more of the other vehicles in the vehicle platoon.

The FEMG system in this embodiment is programmed with certain baseline operating modes. In the generator mode, the clutch 15 is engaged and the motor-generator 3 is driven to generate electrical energy for storage whenever the energy store state of charge is below the minimum charge level, and the clutch will stay engaged until the intermediate charge state level is reached. Once the intermediate charge state level is reached, the FEMG control module 13 switches between the generator, motor, idle, platoon and off modes as needed (platoon mode is discussed further, below). For example, if the motor-generator 3 is being operated with the clutch 15 disengaged to drive the engine accessories, the FEMG control module commands a switch to generator mode and engage the clutch 15 to charge the energy store 11 when braking, deceleration or negative torque events occur (so long as the energy store 11 state of charge remains below the maximum charge state level).

When in the motor mode with the clutch 15 disengaged, the FEMG control module 13 modulates the amplitude and frequency of the current being delivered by the inverter 14 to the motor-generator 3 in order to provide infinitely-variable speed control. This capability permits the motor-generator 3 to be operated in a manner that drives the pulley 5, and hence the engine accessories driven by the pulley 5, at a speed and torque output level that meets the demands of the current operating conditions without waste of energy due to operating at unnecessarily high speed and torque output levels. The FEMG system's variable output control over the motor-generator 3 has the additional benefit of minimizing the amount of stored electrical energy that must be delivered from the energy store 11, reducing energy store charging needs and extending the length of time the energy store 11 can supply high voltage current before reaching the minimum state of charge.

In any of the generator, motor or off modes, the FEMG control module may command the clutch 15 be engaged if the engine requires torque output assistance from the motor-generator, and simultaneously command supply of electrical energy from the energy store 11 to the motor-generator to convert into supplemental torque to be transferred to the engine crankshaft.

The FEMG system may also be operated in a platooning mode, preferably when the level of charge in the energy store 11 is above the minimum level. The FIG. 7 embodiment shows an FEMG system-equipped vehicle's inter-vehicle communications transceiver 701 linked to a vehicle controller 702 programmed to maintain a target separation distance between the vehicle and an immediately preceding vehicle in the platoon. In this embodiment, a platooning controller 702A and an adaptive cruise controller 702B are incorporated in the vehicle controller 702, but either or both of these controllers 702A and 702B may be arranged separately from the vehicle controller 702. The vehicle controller in this embodiment is linked to an engine controller 703, a braking controller 704 and an FEMG system controller 705. The latter engine controller 703 controls the operation of the engine 706 and a retarder 711, the braking controller 704 controls the operation of the vehicle braking systems 707 (for example, the wheel brakes), and the FEMG system controller 705 controls the operation of the motor-generator 708 and the switchable coupling 709 between the engine crankshaft and the motor-generator as needed to generate motor-generator output torque or generate electrical energy for storage.

Figure 7:
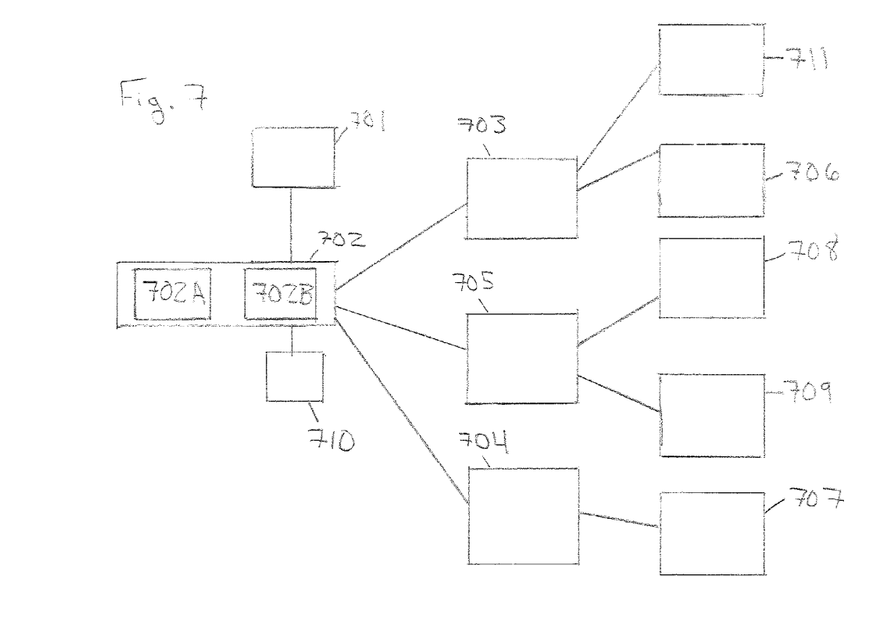
FIG. 7 is a schematic illustration of a platooning control system including an FEMG system in accordance with an embodiment of the present invention.

Based on information received from at least one other vehicle via transceiver 701, the vehicle controller 702 of FIG. 4 determines whether its vehicle is in a vehicle platoon. The information from the at least one other vehicle may be received directly from another vehicle, or indirectly from another vehicle, for example, via infrastructure (such as a cloud-based server, which may or may not include communication with a fleet operation center).

If in a platoon, the vehicle controller controls the operation of the vehicle in a platoon mode. In this mode, based on the received information from transceiver 701, as well as further information received from various vehicle sensors 710 (for example, a front-facing radar distance sensor) and/or other networked controllers in the vehicle, the vehicle controller 702 determines vehicle acceleration and deceleration demands needed to maintain the vehicle's position within the platoon. The FEMG controller 705 in turn controls the operation of the motor-generator 708 and switchable coupling 709 to execute the demanded acceleration or deceleration, while the engine controller 703 and braking controller 704 continue to function responding to the acceleration and/or deceleration demands with reduced engine torque and adjustment of the throttle to maintain the desired speed.

If the acceleration torque required to meet an acceleration demand (or similarly, a retardation torque load required to meet a deceleration demand) is within the capability of the FEMG motor-generator 708, the vehicle controller 702 commands the FEMG controller 705 to generate the desired acceleration (in the form of an output torque supplied via the engine crankshaft to the drive wheels) or deceleration torque (in the form of a torque load during regenerative braking). If the acceleration torque (or retarding force) exceeds the capability of the FEMG motor-generator 708, the motor-generator may be commanded to meet that portion of the demand within its capability, with the rest of the demand being met by other vehicle systems.

For example, if the vehicle controller 702 determines that an acceleration or deceleration required to maintain the vehicle's position in the platoon is greater than the output torque or regenerative braking retardation that the motor-generator 705 is capable of delivering, the vehicle controller 702 may command the engine controller 703 to increase the torque output of engine 706, or the braking controller 704 to apply the braking systems 707, as appropriate, to control the vehicle's position in the platoon. An example in the case of an acceleration demand would be a motor-generator with an output torque upper limit capability of 375 Nm, operating in the presence of an acceleration torque output demand of 400 Nm. The acceleration demand may be met by generating 375 Nm of torque by the motor-generator, with the remaining 25 Nm of torque demand being met by increasing fuel delivery to the engine. Similarly, in the presence of a deceleration demand requiring absorption of 100 KW of kinetic energy and an motor-generator with an electrical energy generation upper limit of 80 KW, the vehicle brakes may be operated to dissipate 20 KW of kinetic energy in parallel with the operation of the motor-generator in generator mode.

Alternatively, the vehicle controller may control some or all of the vehicle's various controllers (e.g., controllers 703-705) to cooperatively generate the desired amount of acceleration or deceleration force. For example, the vehicle controller 702 may command the FEMG controller 705 operate the motor-generator at a fraction of its capability (i.e., at less than 100% of the motor-generator's torque or electrical energy generation upper limit), while the rest of an acceleration or deceleration demand is met by commanding the engine controller 703 or the braking controller 704 to generate the remainder of the required acceleration or deceleration, thereby minimizing the fuel consumed by the engine and/or the waste heat energy dissipated by the vehicle brakes during the platooning operation.

An example of a situation in which the motor-generator may be operated at less than its rated capacity is when only a limited amount of energy storage capacity is available, i.e., when the energy store is already near its upper charging limit and therefore only limited regenerative braking may be performed. In such a case the vehicle controller 702 may otherwise distribute the vehicle positioning control demand between the controllers 703-705, for example by increasing the proportion of the deceleration demand assigned to the braking controller 704 or to the engine retarder.

Another example in the case of an acceleration demand is a situation in which occurs when the motor-generator 708 is being operated to generate torque to operate the engine accessory drive independently from the engine speed (i.e., when the switchable coupling 709 is disengaged), and it is undesirable to engage the switchable coupling to shift engine accessory-driving torque to the engine crankshaft to aid in vehicle acceleration (for example, undesirably slowing the engine cooling fan or a coolant pump to the crankshaft's speed if the switchable coupling 709 was to be engaged to permit the motor-generator 708 to deliver supplemental propulsion torque to the engine crankshaft). In such a case, the engine controller 703 may be commanded to generate all of the demanded acceleration torque with the engine 706 in order to avoid disrupting the operation of the engine accessories.

The FEMG normally responds to a deceleration request in a manner that harvests as much brake energy as possible. However, in the presence of an acceleration request, the system may not respond, based on the battery charge state and other factors. Acceleration requests also may require further processing (i.e., a further level of decision making), for example, determining whether the output is to be limited to a predetermined power level.

One of ordinary skill in the art will recognize the arrangement of the controllers and their functionality in the FIG. 7 embodiment is not limiting, as the various controllers and their programming may be partially or fully integrated to suit a particular vehicle application, and the communications between the control modules may be bi-directional and/or distributed among control modules over a vehicle network, such as the SAE J1939 bus network 65 in FIG. 4.

Figure 8:
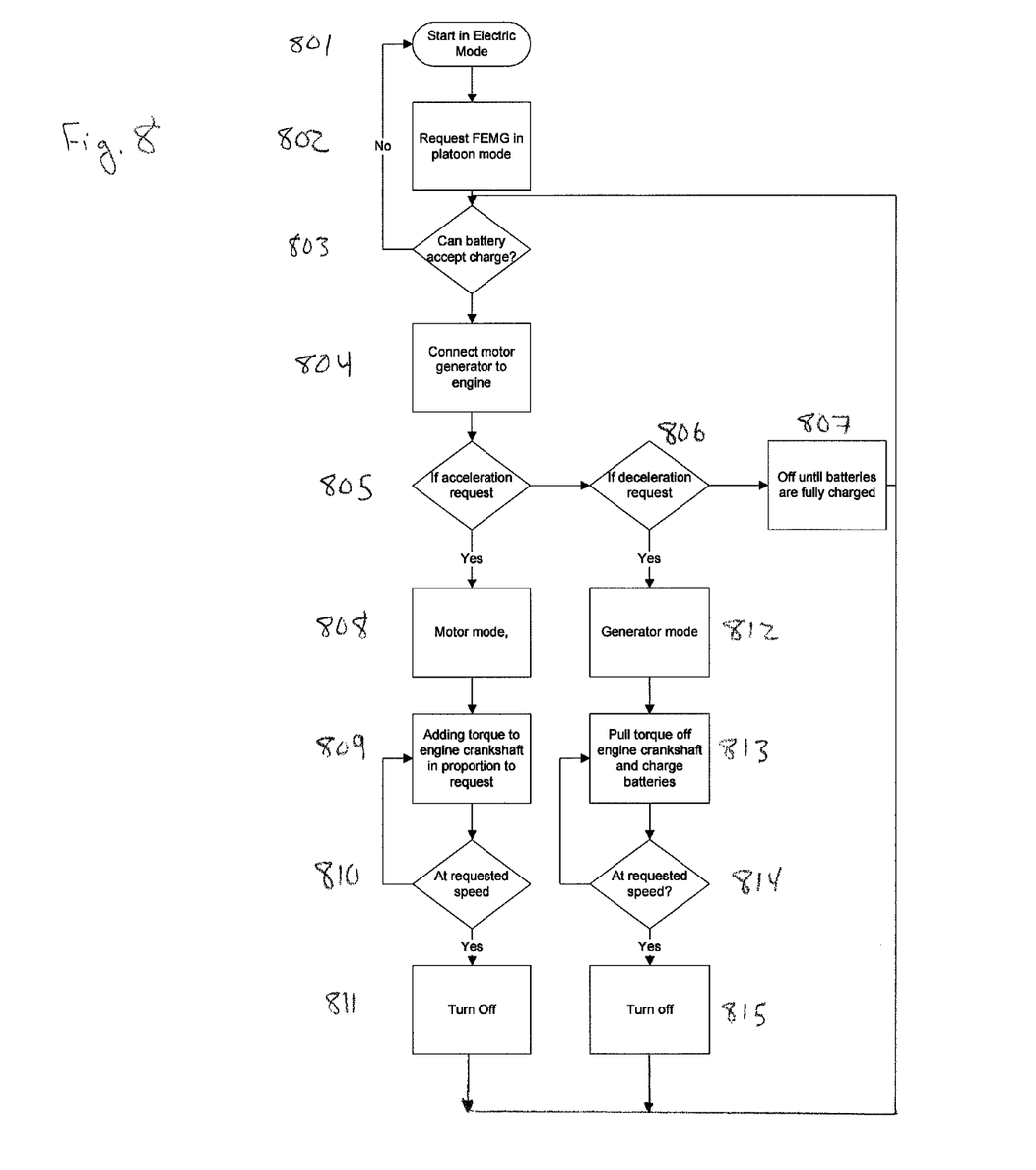
FIG. 8 is a flowchart of a method for operating an FEMG system in a platoon mode in accordance with an embodiment of the present invention.

FIG. 8 illustrates an embodiment of a method for operating an FEMG system in platooning mode. Starting with the vehicle operating in electric mode at step 801, upon receiving a request for operation in platooning mode in step 802, the system determines in step 803 whether the vehicle's energy store (in this embodiment, a battery) is permitted to receive electrical energy, such as electrical energy generated by the motor-generator during regenerative braking. If the system determines that further charging of the battery is not permitted, control reverts to step 801 to restart the method processing.

If the energy store is permitted to receive electrical energy, processing proceeds to step 804, in which the FEMG controller commands the switchable coupling to engage the motor-generator with the engine crankshaft, if the motor-generator is not already coupled to the engine. Next, at steps 805 and 806 the system determines whether there is a present acceleration request or deceleration request. If no acceleration or deceleration request is present (for example, when the platooning controller is not requesting acceleration or deceleration to maintaining vehicle separation distance), at step 807 the motor-generator is maintained in the off state (i.e., no torque output generation or electrical energy output generation) and control returns to step 803.

If at step 805 an acceleration request is present, the system at step 808 enters the motor mode in which the motor-generator generates output torque using electrical energy delivered from the energy store, and in step 809 the motor-generator adds torque to the engine crankshaft in an amount proportional to the acceleration request. In step 810 the system determines whether the target speed for which the acceleration request was issued has been reached. If not, control reverts to step 809 to continue motor-generator delivery of torque to the engine crankshaft; if the target speed has been achieved then in step 811 the motor mode is turned off and control returns to step 803.

Similarly, if a deceleration request is determined to be present in step 806, in step 812 the system switches into generator mode in which the motor-generator converts torque received from the engine crankshaft to electrical energy for storage, and in step 813 the motor-generator executes the conversion of engine torque into electrical energy. In step 814 the system determines whether the target speed has been achieved, and either continues electrical energy generation at step 813 or turns off the generator mode at step 815, as appropriate. Once the generator mode is turned off in step 815, control returns to step 803.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

LISTING OF REFERENCE LABELS

1 air compressor
2 air conditioning compressor
3 motor-generator
4 drive unit gears
5 pulley
6 damper
7 engine cooling fan
8 engine
9 vehicle batteries
10 DC/DC converter
11 energy store
12 battery management system
13 FEMG electronic control unit
14 AC/DC power inverter
15 clutch
16 gearbox
20 engine coolant radiator
49 chassis rail
63 engine control unit
64 sensors
65 SAE J1939 bus
66 vehicle equipment
67 DC bus
68A-68F control lines
69 transistor control line
70 DC/DC voltage converter
71 DC/DC converter
72 12 V battery
73 12 V loads
101 motor-generator clutch position sensor
102 motor-generator speed sensor
103 engine accessory clutch positions
104 air compressor state sensors
105 dynamic heat generator state sensors
106 FEMG coolant temperature sensor
107 FEMG coolant pressure sensor
108 12V battery voltage sensor
111 brake controller
112 retarder controller
113 electronic air controller
114 transmission controller
115 dashboard controller
116 platooning controller
117 adaptive cruise control with braking controller
120 individual engine accessory clutches
121 FEMG coolant pump
307 torque arm
308 anchor point
601 lead vehicle
602 following vehicle
603 communications
701 transceiver
702 vehicle controller
702A platooning controller
702B adaptive cruise controller
703 engine controller
704 braking controller
705 FEMG controller
706 engine
707 braking systems
708 motor-generator
709 switchable coupling
710 sensors
711 retarder

What is claimed is:

1. A method of operating a vehicle having an internal combustion engine and a hybrid electric front end motor-generator system, comprising the acts of:

receiving, at a wireless transceiver of the vehicle, vehicle platooning information from at least one other vehicle;

determining with a vehicle controller whether the vehicle and the at least one other vehicle are operating in a platooning mode in which operation of the vehicle and the at least one other vehicle are coordinated such that at least one predetermined multi-vehicle operating parameter is maintained;

if the vehicle is in platooning mode, maintaining the at least one predetermined multi-vehicle operating parameter by determining with the vehicle controller whether the vehicle is to be accelerated or decelerated to maintain the at least one predetermined multi-vehicle operating parameter, determining with the vehicle controller a required amount of vehicle acceleration or deceleration needed to obtain the at least one predetermined multi-vehicle operating parameter, determining with the vehicle controller whether the required amount of vehicle acceleration or deceleration needed to obtain the at least one predetermined multi-vehicle operating parameter is obtainable from a motor-generator of the front end motor-generator system, if the required amount of vehicle acceleration or deceleration is obtainable from the motor-generator, commanding with the vehicle controller a front end motor-generator controller to control the motor-generator to generate the required amount of vehicle acceleration or deceleration, and
if the required amount of vehicle acceleration or deceleration is not obtainable from the motor-generator, when acceleration is required commanding an engine controller to generate the required amount of vehicle acceleration, and when deceleration is required commanding a braking controller to generate the required amount of vehicle deceleration from a vehicle braking system,
wherein when in the platooning mode, prior to commanding with the front end motor-generator controller the motor-generator to generate vehicle acceleration or deceleration, the vehicle controller determines whether the front end motor-generator system is in an operating state in which a switchable coupling between the motor-generator and a crankshaft of the engine is not to be engaged, and if in said operating state the front end motor-generator controller does not control the motor-generator to generate vehicle acceleration or deceleration.

2. The method of claim 1, wherein
the at least one predetermined multi-vehicle operating parameter includes at least one of a predetermined vehicle separation distance, a predetermined following time and a predetermined speed.

3. The method of claim 2, wherein
if the required amount of acceleration or deceleration is not obtainable from the motor-generator, commanding with the front end motor-generator controller the motor-generator to generate an output torque or a regenerative braking torque load corresponding to a portion the required amount of vehicle acceleration or deceleration, respectively.

4. The method of claim 3, wherein
the portion of the required amount of vehicle acceleration or deceleration the vehicle controller commands the front end motor-generator controller to obtain from the motor-generator corresponds to an upper limit on motor-generator output torque or an upper limit on motor-generator regenerative braking torque load.

5. The method of claim 2, wherein the vehicle controller includes a platooning controller configured to determine the required amount of vehicle acceleration or deceleration needed to obtain the at least one predetermined multi-vehicle operating parameter.

6. The method of claim 5, wherein
at least two of the vehicle controller, the front end motor-generator controller, the engine controller, and the braking controller are integrated with one another.

7. The method of claim 2, wherein
when the motor-generator is operated to generate a regenerative braking torque load, electrical energy generated by the motor-generator is stored in a vehicle energy store.

8. The method of claim 7, wherein
when the vehicle energy store includes at least one of a battery and capacitors.

9. The method of claim 2, wherein
the vehicle platooning information received from the at least one other vehicle is received at least one of directly from the at least one other vehicle and indirectly via infrastructure.

10. A vehicle configured to operate in a vehicle platoon with at least one other vehicle, comprising:
an internal combustion engine;
a hybrid electric front end motor-generator system;
a braking system;
a vehicle-to-vehicle communications system; and
at least one controller, wherein the at least one controller is programmed to execute a platooning mode operation in which the at least one controller
receives from the vehicle-to-vehicle communications system vehicle platooning information from the at least one other vehicle;
determines whether the vehicle and the at least one other vehicle are operating in a platooning mode in which operation of the vehicle and the at least one other vehicle are coordinated such that at least one predetermined multi-vehicle operating parameter is to be maintained;
if the vehicle is in platooning mode, maintains the at least one predetermined multi-vehicle operating parameter by
determining whether the vehicle is to be accelerated or decelerated to obtain the at least one predetermined multi-vehicle operating parameter,
determining a required amount of vehicle acceleration or deceleration needed to obtain the at least one predetermined multi-vehicle operating parameter,
determining whether the required amount of vehicle acceleration or deceleration needed to obtain the at least one predetermined multi-vehicle operating parameter is obtainable from a motor-generator of the front end motor-generator system,
if the required amount of vehicle acceleration or deceleration is obtainable from the motor-generator, commanding the motor-generator to generate the required amount of vehicle acceleration or deceleration, and
if the required amount of vehicle acceleration or deceleration is not obtainable from the motor-generator, when acceleration is required commanding an engine controller to generate the required amount of vehicle acceleration, and when deceleration is required commanding a braking system to generate the required amount of vehicle deceleration,
wherein when in the platooning mode, prior to commanding the motor-generator to generate vehicle acceleration or deceleration, the at least one controller determines whether the front end motor-generator system is in an operating state in which a switchable coupling between the motor-generator and a crankshaft of the engine is not to be engaged, and if in said operating state the at least one controller does not control the motor-generator to generate vehicle acceleration or deceleration.

11. The vehicle of claim 10, wherein
the at least one predetermined multi-vehicle operating parameter includes at least one of a predetermined vehicle separation distance, a predetermined following time and a predetermined speed.

12. The vehicle of claim 11, wherein
if the required amount of acceleration or deceleration is not obtainable from the motor-generator, the at least one controller is further programmed to command the motor-generator to generate an output torque or a regenerative braking torque load corresponding to a portion the required amount of vehicle acceleration or deceleration, respectively.

13. The vehicle of claim 12, wherein the portion of the required amount of vehicle acceleration or deceleration the at least one controller commands a front end motor-generator controller to obtain from the motor-generator corresponds to an upper limit on motor-generator output torque or an upper limit on motor-generator regenerative braking torque load.

14. The vehicle of claim 11, wherein
the hybrid electric front end motor-generator system includes a vehicle energy store, and
when the motor-generator is operated to generate a regenerative braking torque load, electrical energy generated by the motor-generator is stored in the vehicle energy store.

15. The vehicle of claim 11, wherein
the vehicle platooning information received from the at least one other vehicle is received at least one of directly from the at least one other vehicle and indirectly via infrastructure.

16. A vehicle platooning control system, comprising:
at least one controller, programmed to execute a platooning mode operation of a vehicle in which the at least one controller
receives from a vehicle-to-vehicle communications system vehicle platooning information from at least one other vehicle;
determines whether the vehicle and the at least one other vehicle are operating in a platooning mode in which operation of the vehicle and the at least one other vehicle are coordinated such that at least one predetermined multi-vehicle operating parameter is to be maintained,
if the vehicle is in platooning mode, maintains the at least one predetermined multi-vehicle operating parameter by
determining whether the vehicle is to be accelerated or decelerated to obtain the at least one predetermined multi-vehicle operating parameter,
determining a required amount of vehicle acceleration or deceleration needed to obtain the at least one predetermined multi-vehicle operating parameter,
determining whether the required amount of vehicle acceleration or deceleration needed to obtain the at least one predetermined multi-vehicle operating parameter is obtainable from a motor-generator of a front end motor-generator system of the vehicle,
if the required amount of vehicle acceleration or deceleration is obtainable from the motor-generator, commanding the motor-generator to generate the required amount of vehicle acceleration or deceleration, and
if the required amount of vehicle acceleration or deceleration is not obtainable from the motor-generator, when acceleration is required commanding an engine of the vehicle to generate the required amount of vehicle acceleration, and when deceleration is required commanding a braking system of the vehicle to generate the required amount of vehicle deceleration,
wherein when in the platooning mode, prior to commanding the motor-generator to generate vehicle acceleration or deceleration, the at least one controller determines whether the front end motor-generator system is in an operating state in which a switchable coupling between the motor-generator and a crankshaft of the engine is not to be engaged, and if in said operating state the at least one controller does not control the motor-generator to generate vehicle acceleration or deceleration.

17. The vehicle platooning control system of claim 15, wherein
the at least one predetermined multi-vehicle operating parameter includes at least one of a predetermined vehicle separation distance, a predetermined following time and a predetermined speed.

18. The vehicle platooning control system of claim 16, wherein
the vehicle platooning information received from the at least one other vehicle is received at least one of directly from the at least one other vehicle and indirectly via infrastructure.

19. A method of operating a vehicle having an internal combustion engine and a hybrid electric system configured to at least one of selectively apply torque to and receive torque from a drivetrain of the vehicle, comprising the acts of:
receiving, at a wireless transceiver of the vehicle, vehicle platooning information from at least one other vehicle;
determining with a vehicle controller whether the vehicle and the at least one other vehicle are operating in a platooning mode in which operation of the vehicle and the at least one other vehicle are coordinated such that at least one predetermined multi-vehicle operating parameter is maintained;
if the vehicle is in platooning mode, maintaining the at least one predetermined multi-vehicle operating parameter by
determining with the vehicle controller whether the vehicle is to be accelerated or decelerated to maintain the at least one predetermined multi-vehicle operating parameter,
determining with the vehicle controller a required amount of vehicle acceleration or deceleration needed to obtain the at least one predetermined multi-vehicle operating parameter,
determining with the vehicle controller whether the required amount of vehicle acceleration or deceleration needed to obtain the at least one predetermined multi-vehicle operating parameter is obtainable from the hybrid electric system,
if the required amount of vehicle acceleration or deceleration is obtainable from the hybrid electric system, commanding the hybrid electric system to generate the required amount of vehicle acceleration or deceleration, and
if the required amount of vehicle acceleration or deceleration is not obtainable from the hybrid electric system, when acceleration is required commanding an engine controller to generate the required amount of vehicle acceleration, and when deceleration is required commanding a braking controller to generate the required amount of vehicle deceleration from a vehicle braking system,
wherein when in the platooning mode, prior to commanding the hybrid electric system to generate vehicle acceleration or deceleration, the vehicle controller determines whether the hybrid electric system is in an operating state in which a switchable coupling between the hybrid electric system and a crankshaft of the engine is not to be engaged, and if in said operating state the hybrid electric system is not controlled to generate vehicle acceleration or deceleration.

\* \* \* \* \*